US008218745B2

(12) United States Patent  
Coppage

(10) Patent No.: US 8,218,745 B2  
(45) Date of Patent: Jul. 10, 2012

(54) METHOD FOR SELECTION AND ROUTING OF AN OUTBOUND VOICE CALL TO AN APPROPRIATE NETWORK FOR COMPLETION

(75) Inventor: Carl M. Coppage, Kansas City, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1086 days.

(21) Appl. No.: 12/111,472

(22) Filed: Apr. 29, 2008

(65) Prior Publication Data

US 2009/0268725 A1     Oct. 29, 2009

(51) Int. Cl.  
*H04M 15/06* (2006.01)

(52) U.S. Cl. ........... 379/142.05; 379/142.06; 379/88.02; 379/88.17; 379/265.09; 370/352; 370/353; 370/401

(58) Field of Classification Search ............. 379/221.01; 370/352; 455/552.1  
See application file for complete search history.

(56) References Cited

U.S. PATENT DOCUMENTS

| | | | |
|---|---|---|---|
| 6,597,686 B1 * | 7/2003 | Smyk .......................... | 370/352 |
| 7,092,380 B1 | 8/2006 | Chen et al. | |
| 7,171,233 B2 | 1/2007 | Sanchez | |
| 7,263,360 B2 | 8/2007 | Naeini et al. | |
| 7,333,505 B2 | 2/2008 | Yoakum et al. | |
| 7,356,023 B2 | 4/2008 | Lowmaster | |
| 7,630,965 B1 | 12/2009 | Erickson et al. | |
| 7,839,992 B2 | 11/2010 | Croak et al. | |
| 2002/0080751 A1 | 6/2002 | Hartmaier | |
| 2004/0249984 A1 * | 12/2004 | Das et al. .......................... | 709/249 |
| 2005/0064894 A1 | 3/2005 | Kusnitz et al. | |
| 2005/0089018 A1 * | 4/2005 | Schessel ........................ | 370/352 |
| 2005/0131870 A1 | 6/2005 | Krishnaswamy et al. | |
| 2006/0085824 A1 | 4/2006 | Bruck et al. | |
| 2006/0161892 A1 | 7/2006 | Anand et al. | |
| 2007/0076691 A1 | 4/2007 | Varney et al. | |
| 2007/0242619 A1 | 10/2007 | Murakami et al. | |
| 2008/0056272 A1 | 3/2008 | Batta | |
| 2008/0112551 A1 | 5/2008 | Forbes et al. | |
| 2011/0026515 A1 * | 2/2011 | Jacobsohn et al. ............ | 370/352 |

FOREIGN PATENT DOCUMENTS

CN          101330733          12/2008

OTHER PUBLICATIONS

U.S. Appl. No. 12/111,472—Non-Final Office Action dated Nov. 2, 2011.  
U.S. Appl. No. 12/111,549—Non-Final Office Action Dated Nov. 9, 2011.  
U.S. Appl. No. 11/904,897—Non-Final Office Action Dated Jul. 6, 2011.

(Continued)

*Primary Examiner* — Joseph J Nguyen  
(74) *Attorney, Agent, or Firm* — Patton Boggs, LLP

(57) ABSTRACT

A method of initiating a call includes receiving an identifier associated with a called party, the identifier being generated by a telephone handset. The method further includes determining a network category associated with the called party and generating an instruction to initiate a call by the telephone handset on one of at least two networks accessible for communication by the telephone handset. The one of at least two networks is selected by the instruction in response to the determined network category associated with the called party.

5 Claims, 6 Drawing Sheets

OTHER PUBLICATIONS

U.S. Appl. No. 11/904,897—Final Office Action Dated Dec. 1, 2011.
U.S. Appl. No. 11/904,698—Non-Final Office Action Dated Mar. 14, 2011.
U.S. Appl. No. 11/904,698—Final Office Action Dated Oct. 18, 2011.

* cited by examiner

TABLE OF CALLED PARTY ENTRIES 80

| IDENTIFIER | NETWORKS | ADDRESSES | NETWORK CATEGORIES |
|---|---|---|---|
| 123.456.7890 | IP 2000 | 1.1.1.123 | IP |
| | PSTN 123 | 123.456.7890 | PSTN |
| CHARLIE BROWN | EMBARQ 1 | 235.567.8901 | CELL |
| | IP 2001 | charlie@embarq.com | IP |
| ⋮ | ⋮ | ⋮ | ⋮ |

82  84  86  88

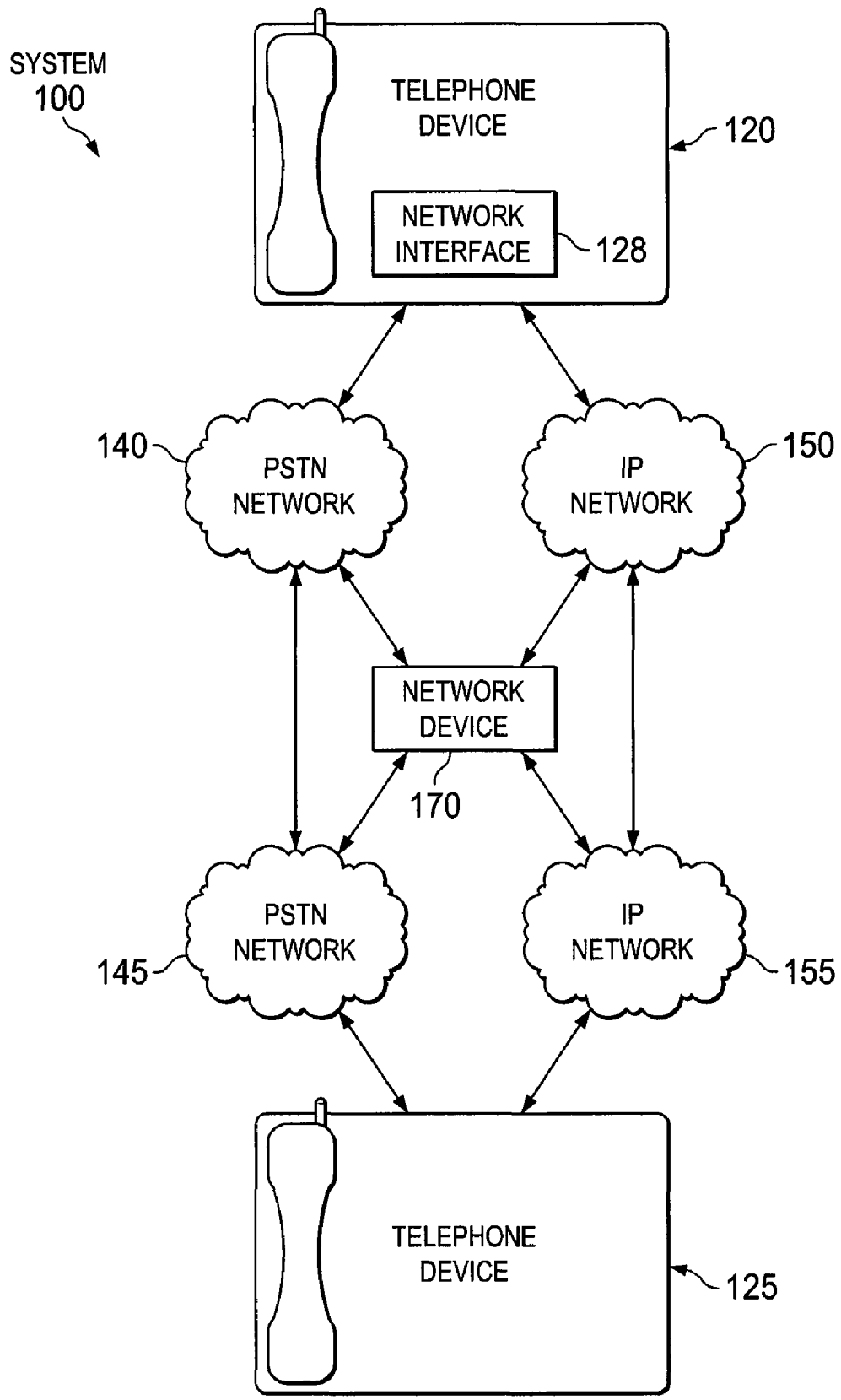

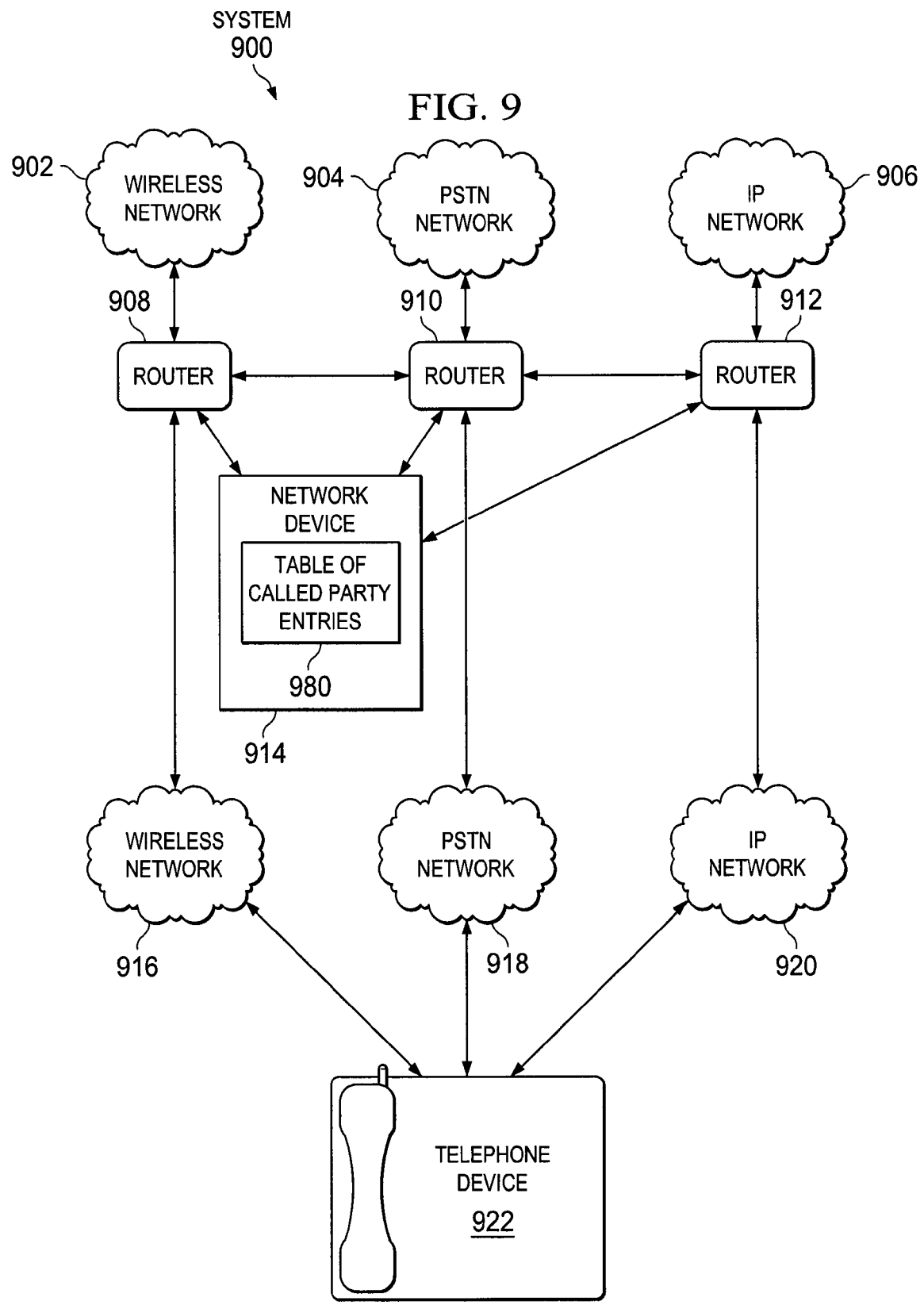

METHOD FOR SELECTION AND ROUTING OF AN OUTBOUND VOICE CALL TO AN APPROPRIATE NETWORK FOR COMPLETION

FIELD OF THE INVENTION

The field of the invention relates in general to telecommunications, and more particularly to a system and method for call connection.

BACKGROUND OF THE INVENTION

The advent of digital packet-based telephony has created a situation where many telecommunications service providers provide telecommunications services, including voice services, over two or more types of networks. For example, in addition to providing customers with voice services over an analog network such as a PSTN network, many providers provide voice services over a digital network such as an Internet Protocol network. Thus, many providers are forced to maintain two networks for voice communications. Similarly, consumers now have many different options available for voice services, including cell phones, analog phones, VoIP phones, and WiFi enabled phones. Many consumers have three or four options available when wanting to place or receive a voice call—some or all of which may be provided to them by the same provider of bundled services. In a complex environment of interconnected networks, calls initiated over one type of network are frequently completed or otherwise carried over a different type of network. For example, someone using a PSTN network may be dialing someone's VoIP telephone, which requires at some point a conversion or format change between network types. As a result, each time a call is carried by more than one type of network, the costs and technical complexities of connecting such a call may increase for a service provider.

SUMMARY

In one embodiment of the present invention, a method of initiating a call is disclosed that includes receiving an identifier associated with a called party, the identifier being generated by a telephone handset. The method further includes determining a network category associated with the called party and generating an instruction to initiate a call by the telephone handset on one of at least two networks accessible for communication by the telephone handset. The one of at least two networks is selected by the instruction in response to the determined network category associated with the called party.

BRIEF DESCRIPTION OF THE DRAWINGS

Illustrative embodiments of the present invention are described in detail below with reference to the attached drawing figures, which are incorporated by reference herein and wherein:

FIG. 3 illustrates one embodiment of a system which includes telephone devices, PSTN networks, IP networks, and a network device;

FIG. 9 illustrates one embodiment of a system for routing incoming calls to an appropriate network connection of a called party.

DETAILED DESCRIPTION OF THE DRAWINGS

Figure 1:
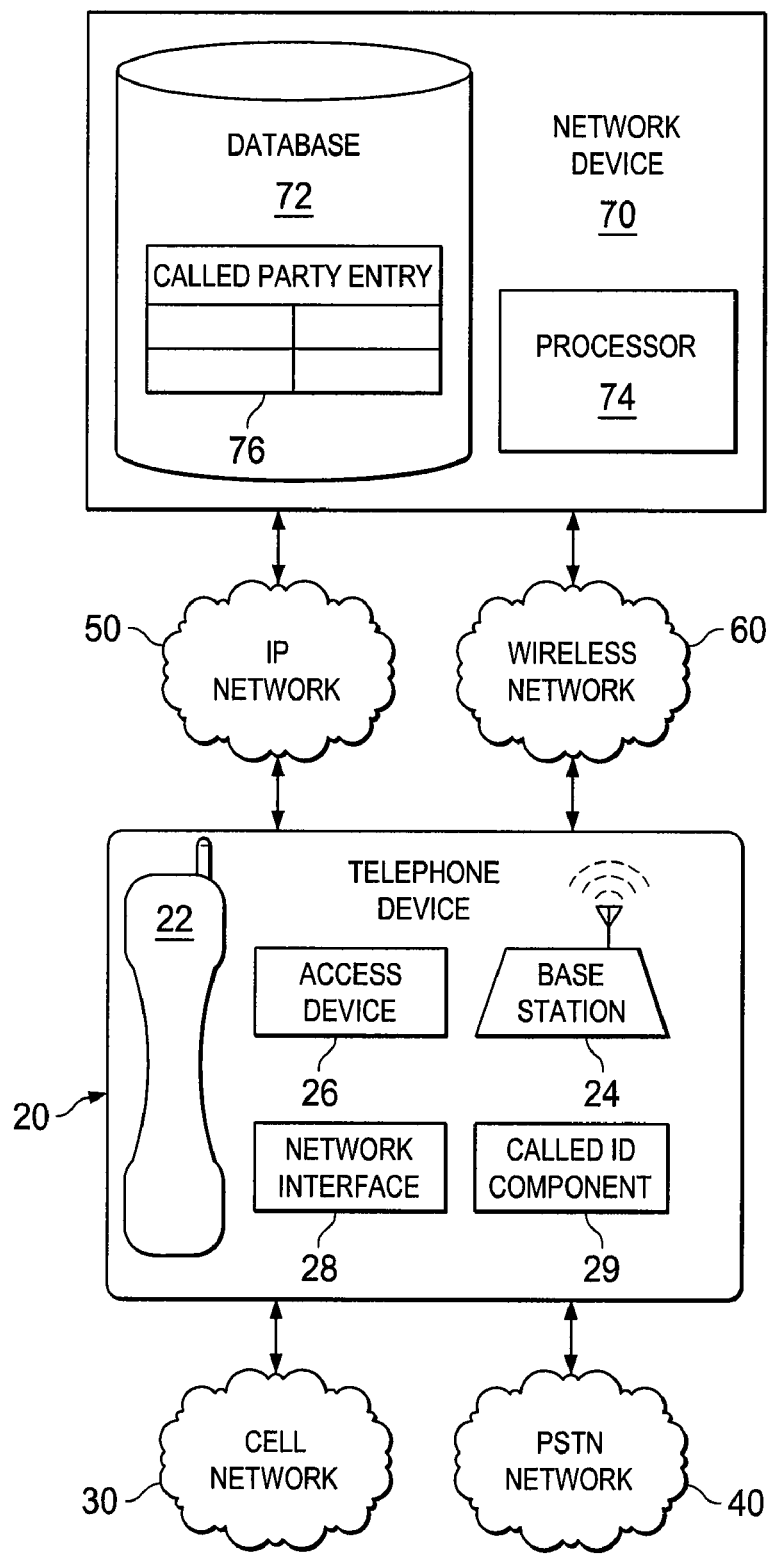
FIG. 1 illustrates one embodiment of a system that includes a telephone device in communication with a cell network, a PSTN network, an IP network, and a wireless network.

In the drawings, like or similar elements are designated with identical reference numerals throughout the several views and figures thereof, and various depicted elements may not be drawn necessarily to scale.

FIG. 1 illustrates a system 10 implemented in accordance with one embodiment of the present invention. System 10 includes a telephone device 20 in communication with a cell network 30, a PSTN network 40, an IP network 50, and a wireless network 60. Telephone device 20 also communicates with a network device 70 over one or more of networks 30, 40, 50, and 60. In general, telephone device 20 queries network device 70 in order to select one of networks 30, 40, 50, or 60 with which to initiate a voice call between telephone device 20 and another telephone device (not illustrated) of a called party. In such a manner, telephone device 20 associated with a calling party can initiate the communication of a voice call using a telecommunications network based on the type of telecommunications network that the telephone device of the called party uses to communicate voice calls.

Telephone device 20 includes a telephone handset 22, a base station 24, an access device 26, a network interface 28, and a called ID component 29. The components of telephone device 20 are provided for illustrative purposes. In alternative embodiments, telephone device 20 may include more or less components than are illustrated in FIG. 1. Although illustrated as a single device, telephone device 20 may be one or more discrete devices or distributed functionality implemented using hardware and/or software. In operation, telephone handset 22 may access one of networks 30, 40, 50, or 60 through one or more of base station 24, access device 26, and network interface 28.

Telephone handset 22 may be any handset, client, or other user interface utilized by a user to communicate over one of networks 30, 40, 50, or 60. In one embodiment, telephone handset 22 may be utilized to communicate voice communications. Alternatively or additionally, telephone handset 22 may be utilized to communicate using pictures, video, text, email, or other messaging functionality. In one embodiment, telephone handset 22 is a wireless handset communicating through base station 24 to one or more of networks 30, 40, 50, or 60.

Base station 24 is a wireless base station that allows telephone handset 22 to access one of networks 30, 40, 50, or 60 wirelessly using any suitable wireless protocol. For example, telephone handset 22 and base station 24 may communicate using WiFi, WiMax, Bluetooth, CDMA, or any other wireless format. Base station 24 may itself communicate either wired or wirelessly to network 30, network 40, network 50, or network 60. For purposes of this application, the term "wired" is meant to imply any type of communication other than communication conducted over air. For example, wired may imply a physical wire, a twisted pair connection, an optical fiber connection, or any other suitable physical link. In one embodiment, base station 24 may communicate with networks 30, 40, 50, or 60 using access device 26 or network interface 28.

Access device 26 may be an integrated access device allowing multiple types of communications to be processed by access device 26 and communicated over one or more of networks 30, 40, 50, or 60. For example, access device 26 may allow voice communications to be conducted over a twisted pair phone line or over a connection to an Internet Protocol network using, for example, voice-over Internet Protocol (IP). Access device 26 may include a DSL modem such that voice and data communications can both be communicated over one of networks 30, 40, 50, or 60. In one embodiment, access device 26 may be a modem suitable for allowing communication by any telephone handset 22 to one or more of networks 30, 40, 50, or 60. For example, access device 26 may include a transceiver capable of communicating with cell network 30, an interface to a twisted pair connection allowing communication over PSTN network 40, a DSL modem, or cable router allowing communication over IP network 50, and/or an additional transceiver allowing communication over an alternative wireless network such as wireless network 60 that is, for example, a WiFi network or WiMax network.

Network interface 28 is a hardware and/or software interface that allows telephone handset 22 to communicate with a specific network such as network 30, network 40, network 50, or network 60. For example, network interface 28 may be a network interface card that allows communication over a local area network, an Ethernet connection, or directly to one of networks 30, 40, 50, or 60.

The descriptions of base station 24, access device 26, and network interface 28 are intended to be representative of examples of means in which telephone handset 22 may communicate with alternative networks that are available to a user for connecting communications, and are not intended to be limiting in scope.

Called ID component 29 may be a traditional caller ID component that identifies by name, telephone number, or geography the source of an incoming voice, text, video, email, or other messaging communication. However, in one embodiment of the present invention, called ID component 29 functions in reverse. More specifically, called ID component 29 may instead identify the name, telephone number, or geographic location of a user or device to which an outbound communication is directed. For example, if a telephone number is dialed on telephone handset 22, prior to the call being connected, or as the call is being connected, called ID component 29 may display the name, telephone number or location of the user or device being called. In one embodiment, called ID component 29 also indicates the type of network connection the called party has available over which to conduct voice calls. For example, a particular called party may only be able to receive voice calls over PSTN network 40. Alternatively, the called party may be able to receive calls over cell network 30, PSTN network 40, or IP network 50. As voice-over IP calls become more common, many users of telecommunications services may, for example, have both connections over a PSTN network 40 and an IP network 50 that they may use to conduct voice calls. In such an embodiment, called ID component 29 is capable of displaying one or more of the networks known to be available to the called party. Although illustrated as a separate component to telephone handset 22, called ID component 29 may be integrated with telephone handset 22. Alternatively, the functionality provided by called ID component 29 may be included in an alternative local or remote network device such as network device 70 with information being communicated to and displayed on telephone handset 22.

In one embodiment, called ID component 29 may be utilized to display a particular name, telephone number, geographic location, or, as described above, networks accessible by a called party. In an alternative embodiment, called ID component 29 may instead or additionally communicate such information to telephone handset 22, base station 24, access device 26, or network interface 28 to allow decision logic in one or more of such devices to select a particular network with which a telephone handset 22 will initiate a telephone call to the called party. For example, if called ID component 29 indicates that a called party has both an IP network 50 and a PSTN network 40 with which they can receive voice calls, telephone handset 22 may elect to use IP network 50 because of a lower cost, better network performance, indicated preference, or other reason. Similarly, network matching may occur, such that one of telephone handset 22, base station 24, access device 26, or network interface 28 may select a network connection of the same category as the network (a "network category") of the called party. A network category is any classification category, type or grouping of networks sharing at least one characteristic or similarity such as, for example, the use of the same or similar protocol, being provided by the same service provider, using the same communications medium (i.e., both wireless, both fiber), both having access to the same network, both having at least a certain level of security, or any other suitable technical, business or assigned characteristic or similarity. In another embodiment, networks can be assigned by a network administrator or user to a particular network category where such assignment is the only or one of the shared characteristic. In one embodiment, categories may be digital and analog or two or more of PSTN, IP, cellular, and WiFi. Network categories may be nested such that there are subcategories. In yet another embodiment, network categories may be created in response to communications between the included networks being of a particular relative or actual cost, type (voice, data, video, etc.), or quality of service. In one embodiment, called ID component 29 may indicate that two different telephone numbers, network addresses, or other identified connections are available to communicate with a particular called party, one of which is associated with communication over an IP network and one of which is associated with a PSTN network. In such an embodiment, telephone handset 22, base station 24, access device 26, or network interface 28 may include decision logic that selects the appropriate network IP Network 50 or PSTN network 40 with which to connect the call that has a category that matches the category of network associated with the telephone number being dialed by telephone handset 22.

Cell network 30 is a wireless network made available to a user of telephone device 20 by a wireless service provider and may be, for example, a CDMA network. Alternatively, cell network 30 may be any wireless network accessible to telephone device 20.

PSTN network 40 is a TDM network utilized by traditional wire carriers offering local and long distance telephone service. In one embodiment, PSTN network 40 is an analog network wherein voice communications are communicated over a twisted pair between a residence or other customer premises and a switching station or central office of a telephone service provider.

IP network 50 is a digital packet network wherein voice and data communications are communicated using one or more packets. In one embodiment, IP network 50 is a packet network that operates using packets communicated according to the Internet Protocol. For example, IP network 50 may communicate voice traffic using voice over Internet Protocol.

Wireless network 60 is a wireless network that is alternatively or additionally available to a user of cell network 30. For example, wireless network 60 may be a WiFi or WiMax network available in the same location as cell network 30 or in locations where cell network 30 is not available. For example, wireless network 60 may be a wireless hotspot located within a particular town, community, or facility such as an airport.

In one embodiment, network device 70 may be a network switch. Alternatively, network device 70 may be a router, feature server, or any other suitable network device. Network device 70 may be a standalone network device or may instead be functionality included in any other network device. Network device 70 includes a database 72 and a processor 74. Database 72 may be any memory structure or device. Processor 74 is a central processing unit, special purpose processor, digital controller, ASIC, or any other combination of hardware and software capable of executing instructions or logic.

Database 72 includes one or more called party entries 76. Called party entries 76 each include an identifier associated with a particular called party. Each called party entry 76 also includes a network category associated with such identifier. In operation, network device 70 may be utilized to determine a network category that a particular called party uses to conduct voice calls or other communications.

Figures 2, 4:
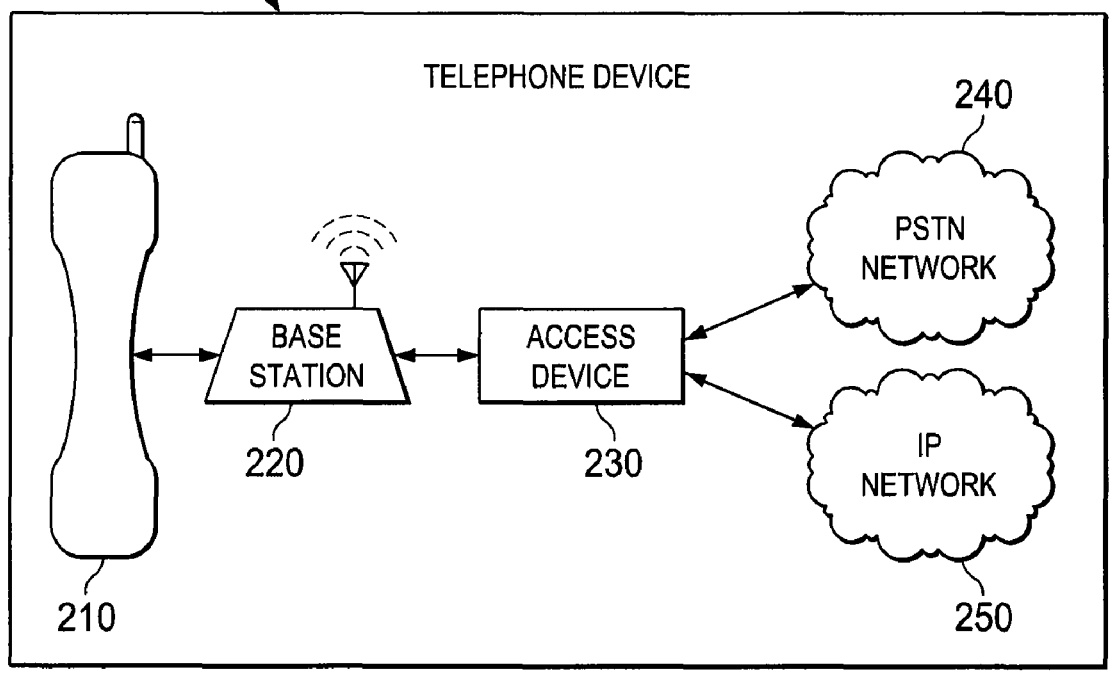
FIG. 2 illustrates one embodiment of a table of connection information associated with particular called parties.
FIG. 4 illustrates one embodiment of a configuration of a telephone device utilized to conduct network communications.

FIG. 2 illustrates one embodiment of a table 80 of called party entries. Table 80 illustrates a table of connection information associated with particular called parties. More particularly, relative to a particular called party, table 80 may illustrate an identifier 82, networks 84, addresses 86, and network categories 88.

In one embodiment, identifier 82 is a telephone number or network address such as an IP address associated with a called party. Alternatively, identifier 82 may be a name. However, identifier 82 may be any suitable identifier such as an alphanumeric sequence.

Networks 84 identify particular telephone communications networks that the associated called party may use to access telecommunication services, such as voice services. For example, networks 84 may include a particular Internet Protocol network associated with a called party's Internet service provider, a particular PSTN network of the called party's traditional local telephone provider, or a particular cell network used by the called party for cell phone services.

Addresses 86 may include any information utilized to dial or address a communication to a particular called party relative to each of the networks used by such called party. For example, a voice over IP voice communication on an IP network may have an address 86 of an IP address. Alternatively, a called party may have an address 86 of a ten digit telephone number for their PSTN network access. Alternatively, a particular called party may utilize an email address as an address 86 for voice over IP calls connected to them over an IP network. In one embodiment, identifier 82 is the same as address 86.

Network categories 88 include network categories associated with each particular network 84. For example, a particular network category 88 may be an IP network, a PSTN network, a cell network, a WiFi network, or some other wired or wireless network.

In one embodiment, table 80 may be stored on a network device such as network device 70 of FIG. 1. Alternatively, table 80 may be stored on another device located anywhere in a network or at the residence or business premises of a user. For example, table 80 may be stored and included as part of called ID component 29 of FIG. 1. Alternatively, table 80 may be stored in whole or in part in base station 24, access device 26, or network device 28 of FIG. 1.

In one embodiment, table 80 may be utilized to select a particular network that a called party utilizes for telecommunications services, such as voice communications. For example, in response to querying table 80, a device used by a calling party or a network may determine that a call should be placed to an address 86 associated with an IP network instead of using a PSTN network, or vice-versa. In such a manner, the matching of network categories may be conducted. For example, a calling party may dial a telephone number of a called party associated with such called party's PSTN network. In response to querying table 80, decision logic may be executed to cause the call request initiated by the dialing of the telephone number to be converted into a call connection request to a different address 86 over an IP network. This decision may be made, for example, in response to the calling party using voice-over Internet Protocol to initiate the call and a desire to have the called party also utilize voice-over Internet Protocol to conduct the voice communication. In such a manner, transitioning from a PSTN network to an IP network or vice-versa may be eliminated such that a voice-over Internet Protocol may be utilized to accomplish the call on an end-to-end basis from the calling party to the called party. In such a manner, any conversion from one call format or protocol to another call format or protocol may be eliminated.

FIG. 3 illustrates one embodiment of a system 100 for implementing various features of the present invention. System 100 includes a telephone device 120, a telephone device 125, a PSTN network 140, a PSTN network 145, an IP network 150, an IP network 155, and a network device 170. In general, telephone device 120 may communicate with network device 170 over IP network 150 or PSTN network 140. Telephone device 120 may communicate with telephone device 125 over IP network 150, IP network 155, PSTN network 140, and PSTN network 145.

Telephone device 120 includes a network interface 128. Network interface 128 may be any suitable network interface, such as network interface 28 described in FIG. 1.

In operation, a calling party using telephone device 120 desiring to initiate voice communications with a called party using telephone device 125 first dials a telephone number or selects an identifier associated with the called party and/or telephone device 125. For purposes of this FIG. 3, such telephone number or other identifier shall be referred to generally as an identifier. Telephone device 120 may communicate such identifier to network device 170 over IP network 120 or PSTN network 140. Network device 170, when receiving such identifier, determines the type of network connections available to the called party or telephone device 125. More particularly, network device 170 may query telephone device 125 and/or a network device associated with telephone device 125 in order to determine the networks used by telephone device 125 to conduct voice services. Alternatively, network device 170 may have such information stored within network device 170 or elsewhere on a network. In one embodiment, network device 170 uses a table, such as table 80 of called party entries described in FIG. 2, to determine a network category of the called party or telephone device 125. Network device 170 then communicates that network category back to telephone device 120. Telephone device 120 then utilizes such network category to select its own network for communicating a voice call to telephone device 125. Once telephone device 120 has selected such network, network interface 128 initiates or selects the appropriate connection to initiate the voice call over the selected network. For example, telephone device 120 may receive a communication from network device 170 that telephone device 125 may communicate over IP network 155. In response to receiving such information, telephone device 120 may then select IP network 150 to engage in matching of network categories by selecting an IP network to communicate with another IP network.

FIG. 4 illustrates one configuration of a telephone device 200 utilized to conduct network communications, such as voice communications. More particularly, telephone device 200 includes a handset 210 in communication with a base station 220 that in turn communicates with an access device 230, which can in turn communicate over a PSTN network 240 or an IP network 250. In such an embodiment, access device 230 may be utilized by handset 210 to initiate a voice call over PSTN network 240 or IP network 250. Upon a telephone number being dialed or an identifier being selected by handset 210, such telephone number or identifier is communicated using base station 220 to access device 230. Access device 230 then determines locally, or by communicating with a remote device, whether or not access device 230 should connect the voice call to PSTN network 240 or IP network 250 in response to the particular telephone number or identifier received from handset 210.

Figure 5:
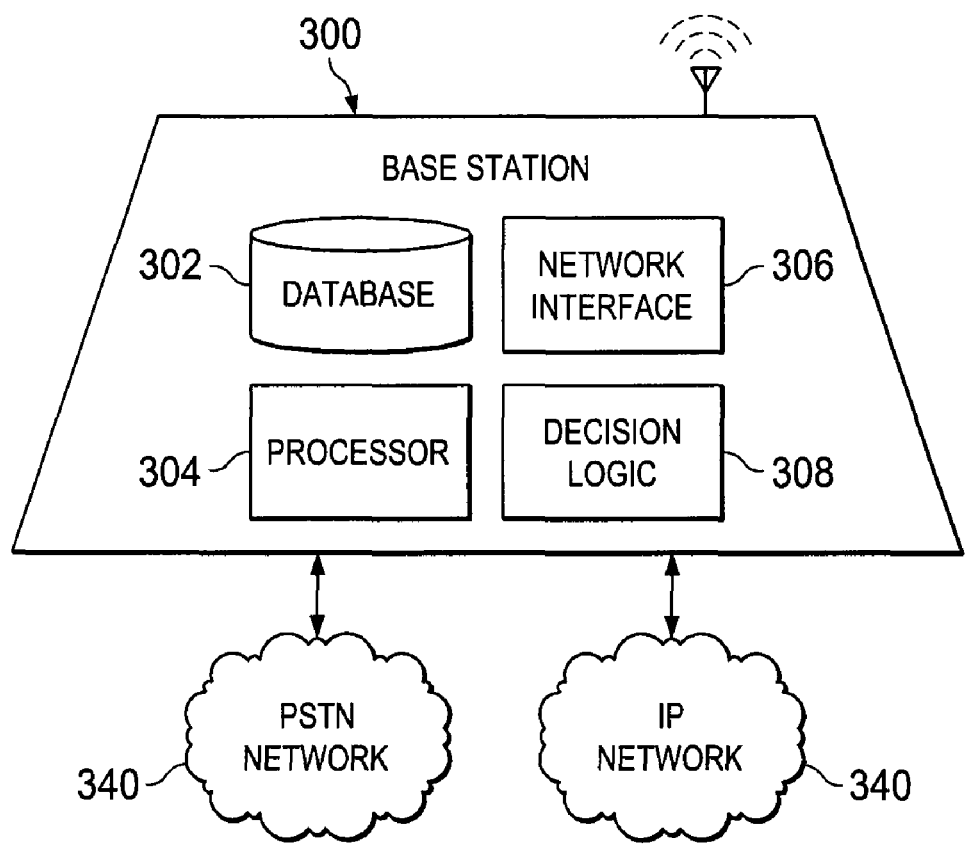
FIG. 5 illustrates one embodiment of a base station that includes a database, a processor, a network interface, and decision logic.

FIG. 5 illustrates one embodiment of a base station 300 implemented in accordance with the teachings of the present invention. Base station 300 includes a database 302, a processor 304, a network interface 306, and decision logic 308. Database 302 is any memory structure or device. Processor 304 is a central processing unit, special purpose processor, digital controller, ASIC, or any other suitable processing device or component. Network interface 306 is any suitable network interface such as network interface 28 described FIG. 1. Decision logic 308 may be any suitable decision logic implemented in software or hardware. For example, decision logic 308 may be stored as computer instructions in software, or may be implemented in hardware by an ASIC or other suitable hardware component.

Base station 300 communicates with IP network 340 and PSTN network 350 to communicate voice calls. In the illustrated embodiment, base station 300 is capable of storing similar information to that illustrated with regard to table 80 of called party entries as described in FIG. 2. In such a manner, a local directory of identifiers of called parties may be utilized to determine particular networks used by such called parties for network communications such as voice communications. Upon receiving a call from a handset in communication with base station 300, base station 300 may determine, based on a telephone number or identifier, the associated network category of a network used by a called party. In response to such determination, base station 300 may then select PSTN network 340 or IP network 350 over which to initiate a voice call. As previously described, such selection can be based on the desire to match network categories, either alone or in combination with other factors such as cost to a user or a network service provider, quality of service, or type of data being communicated. As previously described, for example, while a user may typically initiate calls over IP network 350 using a voice-over Internet Protocol, the call may be instead initiated over PSTN network 340 in response to a determination that the called party only communicates voice calls over a PSTN network. Thus, decision logic 308 may be executed by processor 304 to access database 302 to determine a particular network category associated with a called party to which a telephone call is directed, and may then execute further decision logic 308 in order to instruct network interface 306 to select one of IP network 350 or PSTN network 340 to initiate a voice call to a called party.

Figure 6:
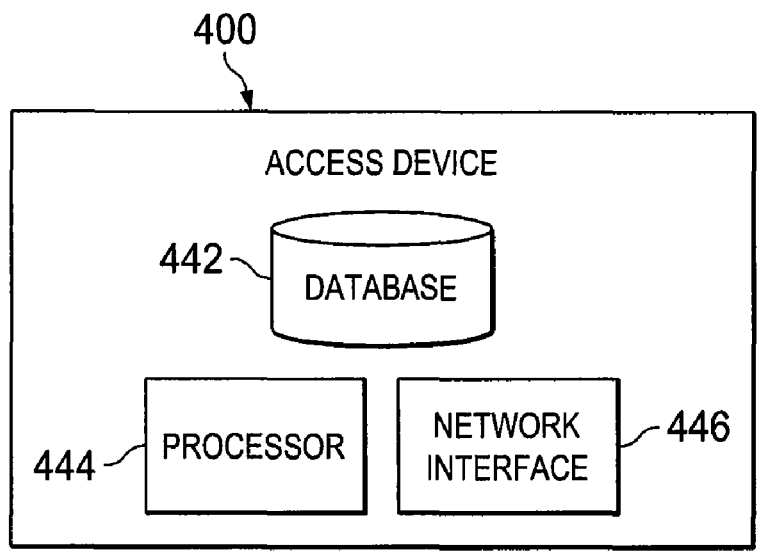
FIG. 6 illustrates one embodiment of an access device which includes a database, a processor, and a network interface.

FIG. 6 illustrates one embodiment of an access device implemented according to the teachings of the present invention. An access device 400 includes a database 442, a processor 444, and a network interface 446. Upon receiving a call from a handset, base station, or other device utilized to initiate or communicate a voice call, access device 400 may determine from an identifier or telephone number the category of a network utilized by a called party to conduct voice communications in a manner similar to that described relative to FIG. 5. Thus, processor 444 may access identifiers in database 442 to determine a network category associated with a particular called party. Processor 444 may then instruct network interface 446 to communicate the voice call over a particular category of network.

Figure 7:
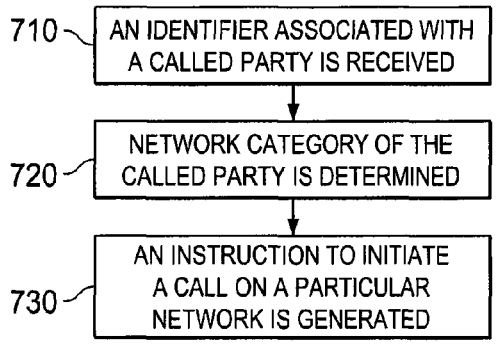
FIG. 7 is a flow chart which illustrates one embodiment of a network category which includes an identifier associated with a called party that is received either directly or indirectly from a telephone handset.

FIG. 7 illustrates one embodiment of a process for determining a network category associated with a called party according to the teachings of the present invention. In step 710, an identifier associated with a called party is received either directly or indirectly from a telephone handset. In step 720, a network category associated with the called party is determined. Such network category can be determined by querying a network or device associated with the called party, by using a database or table such as a directory of identifiers or telephone numbers storing network categories associated with such identifiers or telephone numbers, or by accessing a home location register, visitor location register, network directory, call control manager directory, or any other suitable means. In step 730, an instruction operable to initiate a call on a particular network is generated in response to the determined network category associated with the called party. For example, the instruction may initiate the voice call over an IP network when both a PSTN network and an IP network are available in response to the called party having an IP network available for voice communications.

Figure 8:
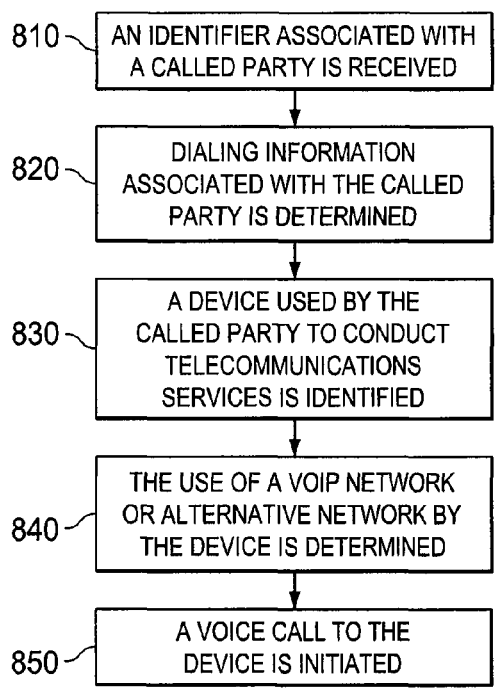
FIG. 8 is a flow chart which illustrates one embodiment of a process for initiating a voice call over a network.

FIG. 8 illustrates one embodiment of a process for initiating a voice call over a network in accordance with the teachings of the present invention. In step 810, an identifier is received from a handset. In step 820, dialing information such as a number or address associated with the identifier is determined. In step 830, a determination is made of whether a device for a called party associated with the dialing information can communicate over a voice-over Internet Protocol network. In step 840, a selection of a voice-over Internet Protocol network or an alternative network is made in response to determining if the dialing information is associated with a device or called party accessible via a voice-over Internet Protocol network. In step 850, a voice call is initiated over the selected network.

FIG. 9 illustrates one embodiment of a system 900 for routing incoming calls to an appropriate network connection of a called party. System 900 includes a wireless network 902, a PSTN network 904, and an IP network 906. Wireless network 902 is in communication with a wireless network 916 over a router 908. Similarly, PSTN network 904 is in communication with a PSTN network 918 over a router 910. IP network 906 is in communication with an IP network 920 over a router 912. Although not illustrated herein, either within one of the networks identified in system 900 or between any two networks illustrated in system 900, additional network elements may be disposed such as gateways, switches, additional routers, edge devices, or network-to-network interfaces (NNIs). Routers 908, 910, and 912 may be in communication with a network device 914. Telephone device 922 is in communication with one or more of wireless network 916, PSTN network 918, and IP network 920. Although illustrated as being in communication with all of such networks, certain embodiments of the present invention may include telephone device 922 being in communication with only one of such networks, a subset of such networks, or such networks and additional networks.

Wireless network 902 and wireless network 916 may be any suitable wireless network, as previously described relative to wireless network 60 in FIG. 1. PSTN network 904 and PSTN network 918 are similar to PSTN network 40 described in FIG. 1. Similarly, IP network 906 and IP network 920 may be any suitable digital packet network, as described relative to IP network 50 in FIG. 1.

Router 908, router 910, and router 912, although illustrated as routers, may be any switch, gateway, MSC, or other network device suitable for routing or switching calls between the networks illustrated in system 900.

Network device 914 may be a standalone network device or part of an integrated network device providing additional functionality. In one embodiment, network device 914 may be similar to network device 70 described relative to FIG. 1. In an alternative embodiment, the functionality provided by network device 914 may be included within an alternative network element such as router 908, router 910, or router 912. Network device 914 includes a table 980 of called party entries. Table 980 of called party entries includes one or more identifiers associated with users of system 900. For example, in one embodiment, system 900 may include the network connections of a particular telecommunications service provider providing wireless, PSTN, and IP network services. In such an embodiment, one or more subscribers of such network services may be included in table 980 and referenced by associated identifiers. Each identifier may identify one or more categories of network services utilized by such subscriber. For example, if a subscriber subscribes to wireless, PSTN, and IP network services, table 980 may include network categories for each of such networks. Thus, by accessing or querying table 980, it may be determined what communication capability a particular subscriber to such telecommunications service provider has for communicating with third parties. For example, if a subscriber subscribes to both PSTN and voice-over IP voice services with such telecommunication service provider, such information can be determined by accessing table 980. Although the information in table 980 has been described relative to a single telecommunication service provider, if known, information regarding a subscriber's services with additional telecommunication service providers may also be included within table 980. For example, a user of system 900 may be a subscriber of PSTN voice services from one telecommunication service provider and a subscriber of IP network services and associated voice over IP services from a second telecommunication service provider. If such information is known, table 980 may include such additional information. In one embodiment, table 980 is similar to table 80 of called party entries described relative to FIG. 2.

Telephone device 922 may be any suitable telephone device for communicating voice, video, text, email, or other messaging services. In one embodiment, telephone device 922 is similar to telephone device 20 as described in FIG. 1. Similarly, telephone device 922 may utilize certain aspects of the functionality described relative to FIGS. 4, 5, and 6.

Telephone device 922 may have one or more network interfaces or connections to different types of networks such as wireless network 916, PSTN network 918, and IP network 920. Thus, for example, telephone device 922 may be associated with a particular subscriber of a telecommunication service provider who subscribes to certain network services associated with wireless network 916, PSTN network 918, and/or IP network 920. In one embodiment, such information regarding the services associated with telephone device 922 may be identified in table 980 of called party entries within network device 914. Thus, table 980 of called party entries may track the communications capabilities of telephone device 922 and the network connections available to such telephone device 922.

In operation, system 900 allows an alternative method of network category matching to that previously described. In operation, an incoming telephone call is received by either wireless network 902, PSTN network 904, or IP network 906. When such telephone call is received at router 908, router 910, or router 912 as a call connection request, the receiving router communicates the called party's telephone number or other identifier to network device 914. Network device 914 accesses table 980 of called party entries by such telephone number or identifier to determine the different ways in which the called party may communicate a voice telephone call. In particular, network device 914 determines if a particular telephone device 922 associated with the called party may communicate voice calls over a connection to a network of the same network category of the network 902, 904, or 906 from which router 908, router 910, or router 912 received the call connection request. Thus, if a call connection request was received over IP network 906 at router 912, router 912 would pass the called party identifier to network device 914 for network device 914 to use to access table 980 to determine if the called party's telephone device 922 is capable of also communicating over an IP network using, for example, voice-over IP protocol.

In one embodiment, if a called party has one or more telephone numbers or network addresses associated with the ability to communicate voice communications, network device 914 may substitute a particular telephone number or IP address from that actually included in the call connection request. For example, if a call is received from IP network 906 at router 912 using a telephone number associated with a PSTN network connection, network device 914 may instead redirect the call to a telephone number associated with an IP network connection such that the network category of IP network 906 is matched to a corresponding IP network such as IP network 920. In such a manner, incoming calls may be rerouted to alternative connections associated with a particular subscriber of network services to ensure that no conversion needs to occur from, for example, a voice-over IP protocol to an analog format or other format associated with, for example, a PSTN network. Decision logic may be included in network device 914 to take into account additional factors, such as an increase in the cost of a call.

Although telephone device 922 is illustrated as a single telephone device and previously described as being similar to telephone device 20, telephone device 922 may in fact be multiple communication devices associated with a particular subscriber of the telecommunication service provider or called party. For example, a called party may have a cell phone, a voice over IP phone, and a traditional PSTN telephone handset. Even with such separate devices, system 900, and network device 914 more specifically, may still implement the features of the present invention by routing calls or redirecting calls to a particular telephone device 922. For example, a telephone call originally intended for a PSTN telephone may instead be routed to a number associated with a separate telephone device used for voice over IP services.

Figure 10:
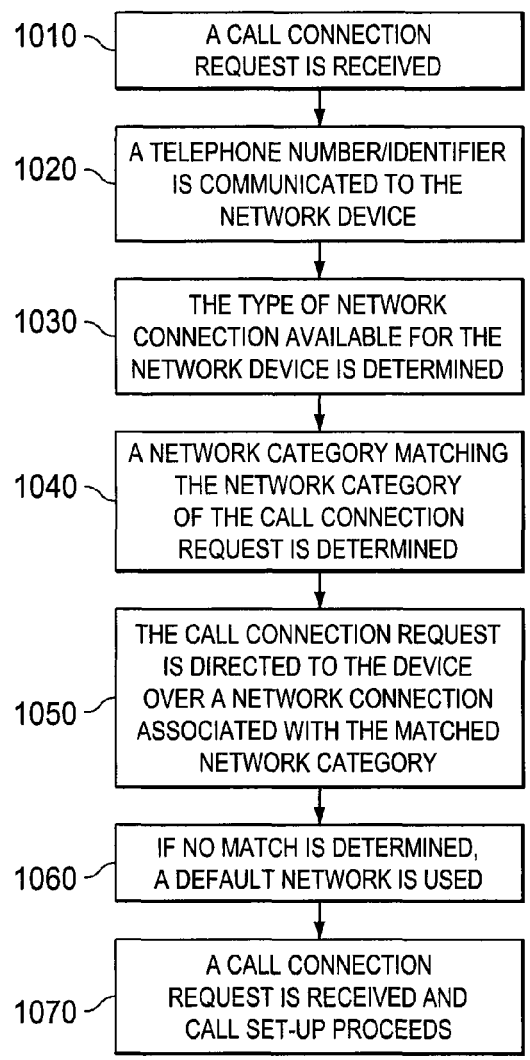
FIG. 10 is a flow chart which illustrates one embodiment of a process for directing incoming voice calls to a particular network connection associated with a called party.

FIG. 10 illustrates one embodiment of a process for directing incoming voice calls to a particular network connection associated with a called party. In step 1010, a call connection request is received at a network device from a network associated with a particular network category. In step 1020, a telephone number or identifier included as part of the call connection request is communicated to a network device. In step 1030, the network device determines the types of network connections available to a telephone device associated with a called party to which the call connection request is directed. In step 1040, the network device determines if any of such available network connections are of the same network category as the network from which the call connection request was received. In step 950, if there is a match of network categories between the network from which the call connection request is received and a network to which a telephone device of the called party has access, the call is directed to the telephone device over the network connection associated with the matched network. In step 970, if there is no match of network categories, the call connection request proceeds according to the original received telephone number or identifier, or to a default network associated with the called party. In one embodiment, call connection requests to a particular called party may be defaulted to a PSTN network if no match of network categories is determined. In step 980, a call connection request is received by a telephone device associated with the called party and call set up proceeds.

There has been described a system and method for distributing electronic information. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, particular additional servers, computers, networks and the like may be used to convey the functions and related stored information without departing from the inventive concepts.

What is claimed:

1. A method of initiating a call, the method comprising:
   receiving, at a network device over a first network, an identifier associated with a called party, the identifier being generated by a telephone handset;
   determining, by the network device, a first security level associated with the first network;
   identifying, by the network device, a plurality of networks associated with the called party using the identifier, wherein identifying, by the network device, the plurality of networks associated with the called party comprises querying a database to determine a second security level for each network in the plurality of networks;
   automatically selecting, by the network device, an identified network from the plurality of networks associated with the called party having the second security level at least equal to the first security level; and
   completing a call to the called party using the identified network.

2. The method of claim 1, wherein the method further comprises communicating instruction to the telephone handset.

3. The method of claim 1, wherein the method further comprises communicating instruction to a device associated with the telephone handset.

4. The method of claim 1, wherein identifying the plurality of networks associated with the called party further comprises determining a network over which a handset of the called party communicates voice calls.

5. The method of claim 1, wherein identifying the plurality of networks associated with the called party further comprises determining whether the called party utilizes a digital packet telephony network or another network.

* * * * *